United States Patent [19]

Cobean et al.

[11] 4,356,394

[45] Oct. 26, 1982

[54] APPARATUS FOR APPLYING RADIANT BEAM

[75] Inventors: Richard W. Cobean, Libertyville; Michael F. Wicnienski, Antioch; Gary Feldman, Wilmette, all of Ill.

[73] Assignee: Baxter Travenol Laboratories, Inc., Deerfield, Ill.

[21] Appl. No.: 230,076

[22] Filed: Jan. 30, 1981

[51] Int. Cl.³ .............................................. G01J 1/20
[52] U.S. Cl. .................................. 250/222 R; 141/1
[58] Field of Search ................... 250/201, 216, 222 R; 141/1

[56] References Cited

U.S. PATENT DOCUMENTS 4,157,723  6/1979  Granzow et al. ...................... 141/1

Primary Examiner—David C. Nelms
Assistant Examiner—Darwin R. Hostetter
Attorney, Agent, or Firm—Paul C. Flattery; John A. Caruso; Garretson Ellis

[57] ABSTRACT

Apparatus for applying a radiant beam against an opaque diaphragm (18) to melt an aperture in the diaphragm (18). Bracket means (12) are provided for positioning the diaphragm (18) at a predetermined position, along with a source of the radiant beam (20) and electric circuit means (21) for activating the source (20). Photocell means (52) may be positioned whereby a properly positioned diaphragm (18) initially shades the photocell (52) from the beam, and the beam strikes the photocell (52) when the aperture is formed. Means are provided to shut off the radiant beam responsive to the beam striking the photocell (52). The photocell (52) may be positioned in a pivotable switch arm (46), and the radiant beam source (20) may be a special filament-type light bulb (20) with a focusing reflector (24).

18 Claims, 8 Drawing Figures

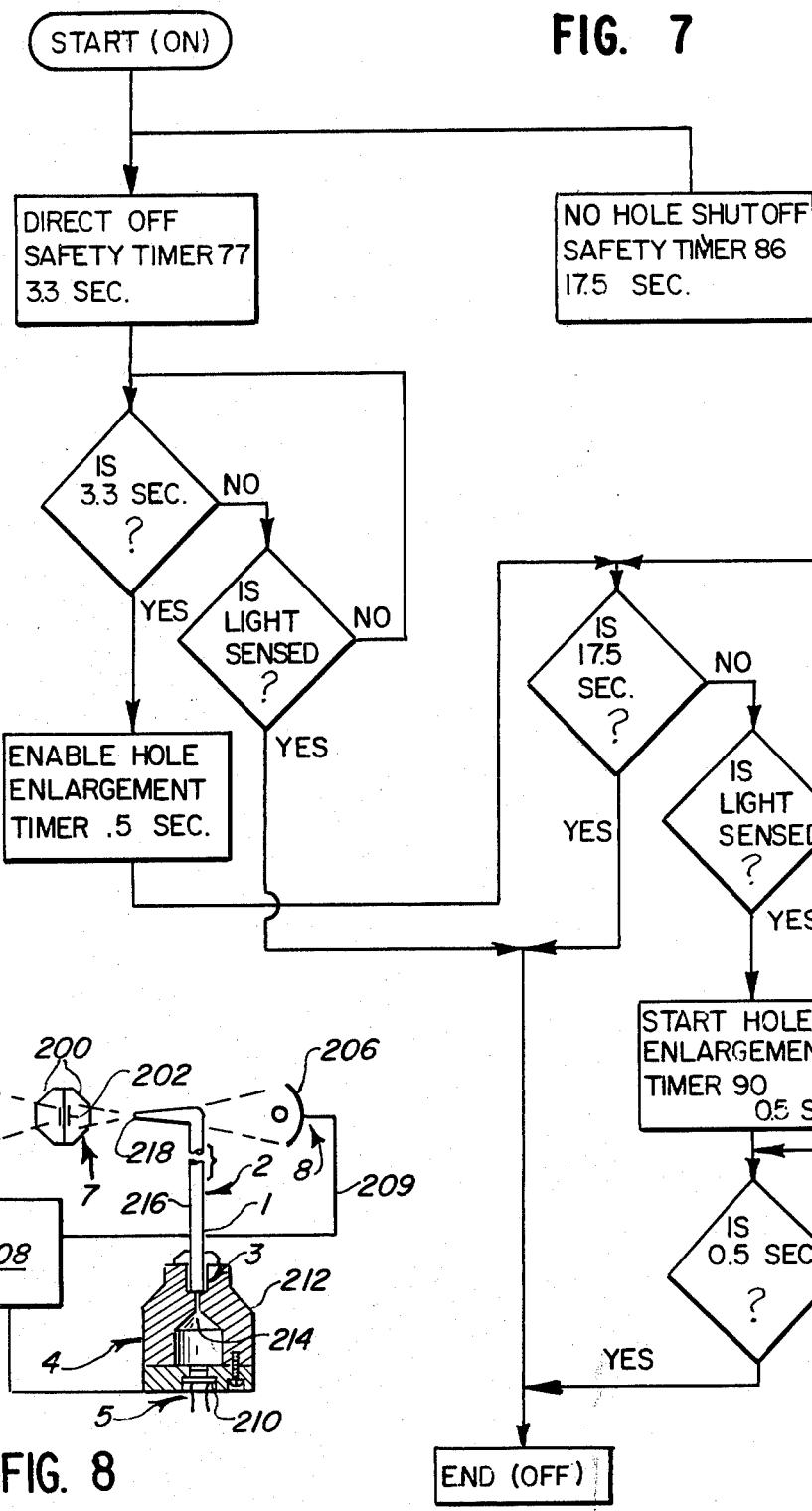

APPARATUS FOR APPLYING RADIANT BEAM

TECHNICAL FIELD

The invention relates to apparatus for applying a radiant beam to open an aperture in an opaque diaphragm. Particularly, the diaphragms to be opened may be part of sterile connectors which may be found on medical equipment adapted for the sterile transfer from one container to another of blood, blood components, parenteral solution, or other materials, in which an assurance of sterile transfer is required, for example as disclosed in U.S. Pat. Nos. 4,157,723 and 4,223,675, or co-pending U.S. application Ser. Nos. Ammann et al. U.S. Ser. No. 005,749, filed Jan. 23, 1979; Boggs et al. U.S. Ser. No. 027,575, filed Apr. 6, 1979; Bellamy et al. U.S. Ser. No. 091,688, filed Nov. 5, 1979; and Dossin U.S. Ser. No. 196,966, filed Oct. 14, 1980.

BACKGROUND ART

Apparatus for the joining or sealing of plastic substances by means of radiant energy is well known. By way of example only the Hagedorn U.S. Pat. No. 2,553,259, Gournelle U.S. Pat. No. 2,958,637, and Valsamakis et al. U.S. Pat. No. 3,509,317 disclose apparatus for sealing or welding plastics together with the use of focused radiant energy. Also, Becker et al. U.S. application Ser. No. 956,590, filed Nov. 1, 1978 and entitled "Method of Radiant Heat Sealing of a Balloon Onto a Catheter Employing Tinted Shrink Tubing" further discloses the use of focused, radiant energy for sealing utilizing a plurality of lamps having small, hot filaments and highly polished metal elliptical reflectors.

However, the prior art is primarily directed at heat sealing through the use of radiant energy, while aperture formation in a diaphragm by radiant energy is significantly different in its operation.

By this invention, apparatus is provided which can produce reliable hole opening between the abutting membranes of a pair of sterile connectors, particularly of a type as described in the first cited patent application above, being adapted for reliable, convenient, and trouble-free operation so that preferably sterile connection may be made on a semiautomated basis by the user between various containers for medical fluids and the like, as part of routine hospital or blood banking operations. Particularly, the apparatus may be adapted to avoid overirradiation of the diaphragm, which can result in spattering of the plastic material and an excessively large hole without the desired good sealing about the newly formed aperture.

DISCLOSURE OF INVENTION

By this invention apparatus is disclosed for applying a radiant beam against an opaque diaphragm, to melt an aperture in the diaphragm. As stated above, the specific purpose of this is in conjunction with the sterile connectors referred to above, but it is also contemplated that other hole formation procedures may also be utilized in this apparatus.

The apparatus of this invention comprises bracket means for positioning the diaphragm at a predetermined position, a source of a radiant beam for melting a hole in the diaphragm, and electric circuit means for activating the source of radiant beam.

In accordance with this invention, photocell means is positioned whereby a properly positioned diaphragm initially shades the photocell means from the beam. As the hole is formed through the diaphragm by the beam, the beam immediately strikes the photocell. Means are then provided to shut off the radiant beam, responsive to the beam striking the photocell. By this manner overirradiation of the diaphragm can be reliably avoided in an automated manner.

It is preferred for the electric circuit means described above to include first timer means for shutting off the beam if it strikes the photocell within a predetermined first time period, measured from initiation of the beam. This first time period might be about 3 seconds, and represents a time period in which it would not be possible for a hole to be normally formed through the specific diaphragm utilized. Thus, if the photocell does sense the radiant beam during this first time period, it is an indication that something is wrong with the operation of the apparatus, and the apparatus thus is automatically shut down as a safety measure. For example the apparatus may have been activated without a diaphragm being properly positioned in its seat, so that the beam is not focusing on the diaphragm.

The electric circuit means also may include second timer means for shutting off the beam after a predetermined second time period, measured from initiation of the beam and longer than the first time period. This can shut off the apparatus in a manner irrespective of whether or not a hole has been formed through the diaphragm. For example, the second time period may be 18 to 20 seconds, or specifically 18.5 seconds, and represents the time at which all normal circumstances a hole should have been punched through the diaphragm. Accordingly, even if a hole is not punched through the diaphragm, the machine is shut off, since once again such a circumstance would indicate that something is wrong. If desired, an alarm or other indication of abnormality may be operated to alert the operator to the abnormality of operation.

The electric circuit means may also include third timer means to delay shutting off of the beam for a predetermined third time period following the moment that the beam strikes the photocell. Such a time period may be typically from 0.5 to 1 second, and specifically 0.8 second, and may be provided to assure formation of a hole in the diaphragm of the desired size by permitting an additional 0.8 second of irradiation following the first breakthrough of the radiant beam and formation of the aperture. The added 0.8 second allows the hole to enlarge, and allows molten plastic material of the diaphragm to form a seal around the aperture, which provides a hermetic seal between abutting membrane pairs in the case when an aperture is being formed through them. Also, this time period is useful in the circumstance where the radiant beam is shining through a pair of abutting diaphragms in which the diaphragm closer to the radiant beam is transparent, and the rearward diaphragm is opaque. In this instance, a small amount of time is often needed for heat to pass by conduction from the opaque to the transparent diaphragm to cause hole opening to take place in the transparent diaphragm as well as the opaque.

It is also desirable for the radiant beam source to be a filament-type light bulb with an elliptical focusing reflector having a reflecting surface that reflects substantial radiation emitted by the filament, for example an aluminized reflector. Such a filament may be positioned essentially at the focus of the elliptical reflector with the filament preferably having a length of no more than ¼ inch and the diameter of no more than ⅛ inch, so that the radiation propagated may be focused into a small spot at the diaphragm. The filament may have a normal operating temperature of at least 3,000° K. for providing an intense, focused radiant beam of no more than essentially 0.3 inch diameter to the predetermined position of the diaphragm.

The desired light bulb may be a halogen cycle lamp having a quartz envelope for infrared transparency. Such lamps are commercially available, having small filaments and high operating temperatures. However, the commercially available lamps typically have a dichroic reflector which does not reflect infrared. It is preferred in this invention for such a lamp to be modified to have, for example, an aluminized reflector so that a large amount of radiation produced is focused to the predetermined position of the diaphragm for greater efficiency of hole opening operation.

It is also preferred for the diaphragm-positioning bracket means of this invention to comprise a first seat for engaging and positioning the unit containing the diaphragm in the predetermined position, and a second seat carried by a pivotable switch arm to permit the second seat to also engage the unit, to secure it in one pivoting position of the switch arm, and to initiate the radiant beam source in the same switch arm pivoting position.

The second seat of the switch arm may preferably carry the photocell so that it is brought into the path of the radiant beam in the one pivoting position described above, but being initially in the shadow of a properly emplaced diaphragm as described above. Accordingly, as the hole opening takes place, the radiant beam strikes the photocell with the desired effects as described above. Thereafter, the switch arm may be pivoted to an open position, permitting easy removal of the unit containing the diaphragm with the newly formed aperture.

It is also preferred for the photocell in the second seat to reside in a tunnel defined in the second seat, so that the photocell is shielded from side illumination, for example illumination passing through transparent housing portions surrounding the diaphragm, so that the accidental actuation of the photocell is avoided prior to hole opening of the diaphragm.

As used herein "photocell" is intended to cover any type of light sensing device, including but not limited to a phototransistor, a photodiode, a photovoltaic cell, a photoresistive cell, etc.

BRIEF DESCRIPTION OF DRAWINGS

FIG. 7 is a flow diagram of the operation of the circuit of FIGS. 5 and 6.

FIG. 8 is a schematic view of modified apparatus of this invention.

DESCRIPTION OF SPECIFIC EMBODIMENT

Referring to FIGS. 1 through 4, the apparatus of this invention comprises a casing 10 which defines a recess 12, which is proportioned to receive a joined set of sterile connectors 14, 16, each of which includes a pair of abutting, facing thermoplastic diaphragms 18 through which an aperture is to be punched by means of radiation in the manner specifically described by the patents and applications first cited above. It is contemplated that any design of sterile connector may be utilized, although the apparatus of this invention is preferably proportioned with a recess 12 shaped to snugly receive the contours of the specific design of sterile connector to be processed.

Figure 3:
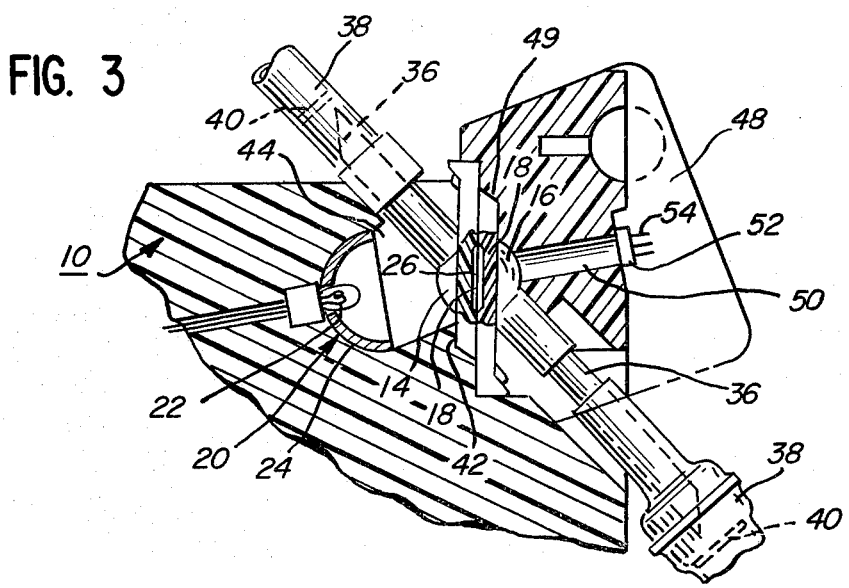
FIG. 3 is a detailed, sectional view taken along line 3—3 of FIG. 2.
Figure 5:
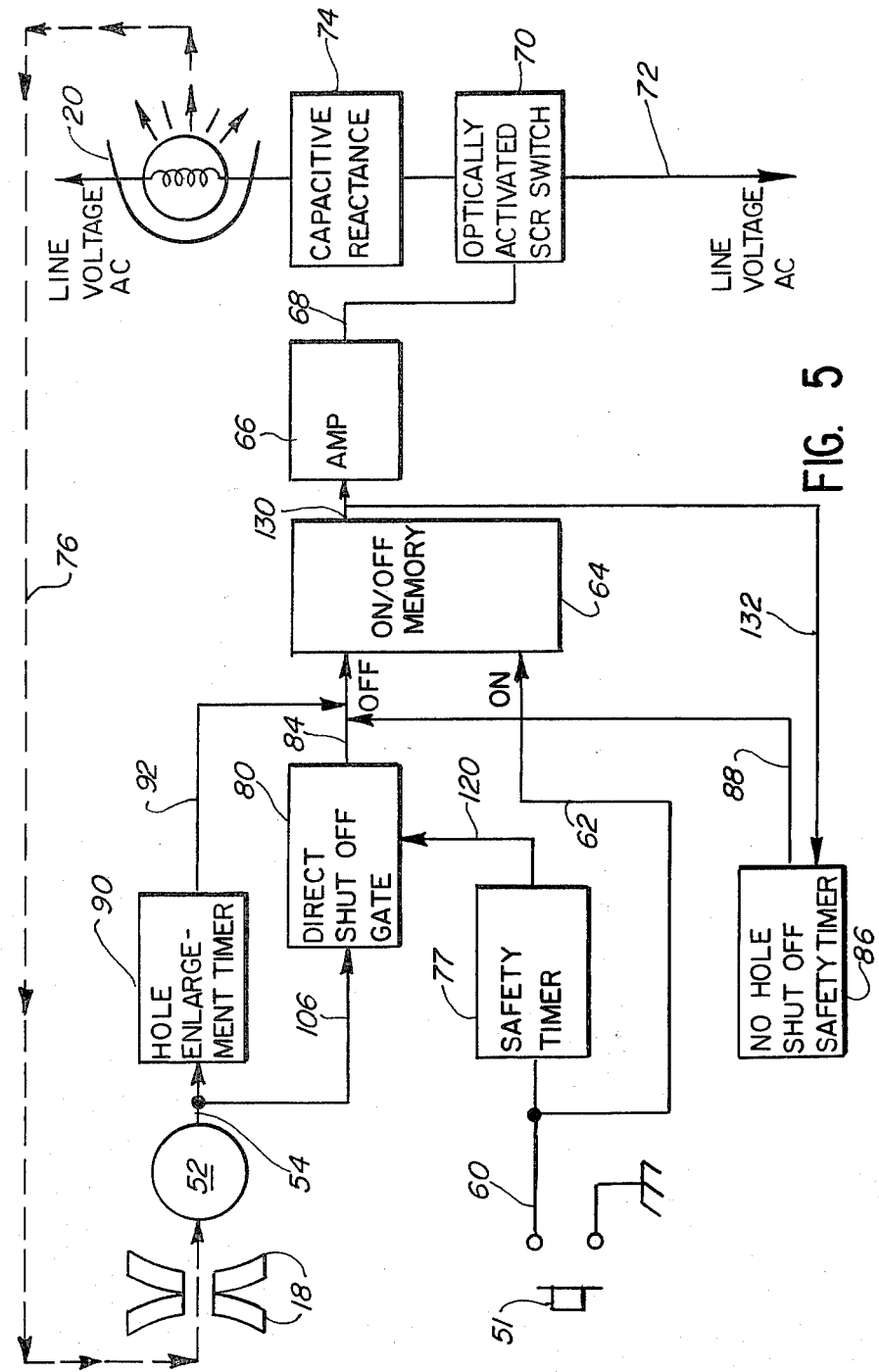
FIG. 5 is a block diagram of the circuitry of the apparatus of FIGS. 1-4.

As shown in FIG. 3, housing 10 carries a filament-type light bulb 20 for use as the radiant beam source herein, supplied with operating electric current as controlled by circuitry 21, of a design as shown in FIG. 5. As previously stated, filament-type light bulb 20 preferably comprises a small, hot filament 22, having an elliptical, preferably aluminized reflector 24 capable of reflecting substantial radiation emitted by the filament and focusing it at a predetermined position 26, which is occupied by a preferably central portion of the abutting, facing diaphragms 18. The focused spot of radiation from light bulb 20 on diaphragms 18 is preferably no more than essentially 0.3 inch in diameter, and typically 0.2 inch in diameter.

Specifically, a type of lamp used herein may be a type EKN lamp rated at 120 watts at 17.5 volts and a 3200° color temperature having a 0.141 inch diameter focus circle at 1.5 inches in front of the reflector's rim which would be the desired point where the membranes would be positioned. The lamp can have an aluminized reflector, and would be a small-envelope tungsten filament halogen cycle quartz bulb with its filament located in manufacture at the desired first focus of the ellipse of the reflector. It may be desired to operate the lamp at less than its rated wattage, for example 55 watts, to obtain the desired amount of radiation for optimum opening of the apertures through the diaphragms.

As shown, the specific sterile connector system may be part of a system of containers 28, 30 which are initially separate, and communicate through tubings 32, 34 to their respective sterile connectors 14, 16, which are attached in sealed manner to the tubings. The separate containers may be locked together by means of their sterile connectors, inserted into recess 12, and processed by the apparatus of this invention for reliable hole opening procedure, so that a sterile access may be obtained between the two containers. For example, one of the containers 30 may contain a carbohydrate solution, and the other container 28 may contain an amino acid or a protein hydrolysate solution, with the two containers being intended for mixing together to provide a total parenteral nutrient solution for a hospitalized patient which may be stored for a period of time after mixing because of the sterile procedure used. Alternatively, the containers may be for the transfer of blood or its components.

As shown, each sterile connector 14, 16 terminates in a hollow spike 36 which is positioned within a boot 38 which may be collapsed so that each spike 36 can penetrate a diaphragm 40, to provide an auxiliary openable seal in a manner described in some of the patent applications cited above.

Within recess 12, the first seat 42 is defined, being preferably of the shape of sterile connector unit 14 intended to rest against it. Within first seat 42 an aperture 44 is provided for the light from lamp 20 to pass to diaphragms 18.

Figure 1:
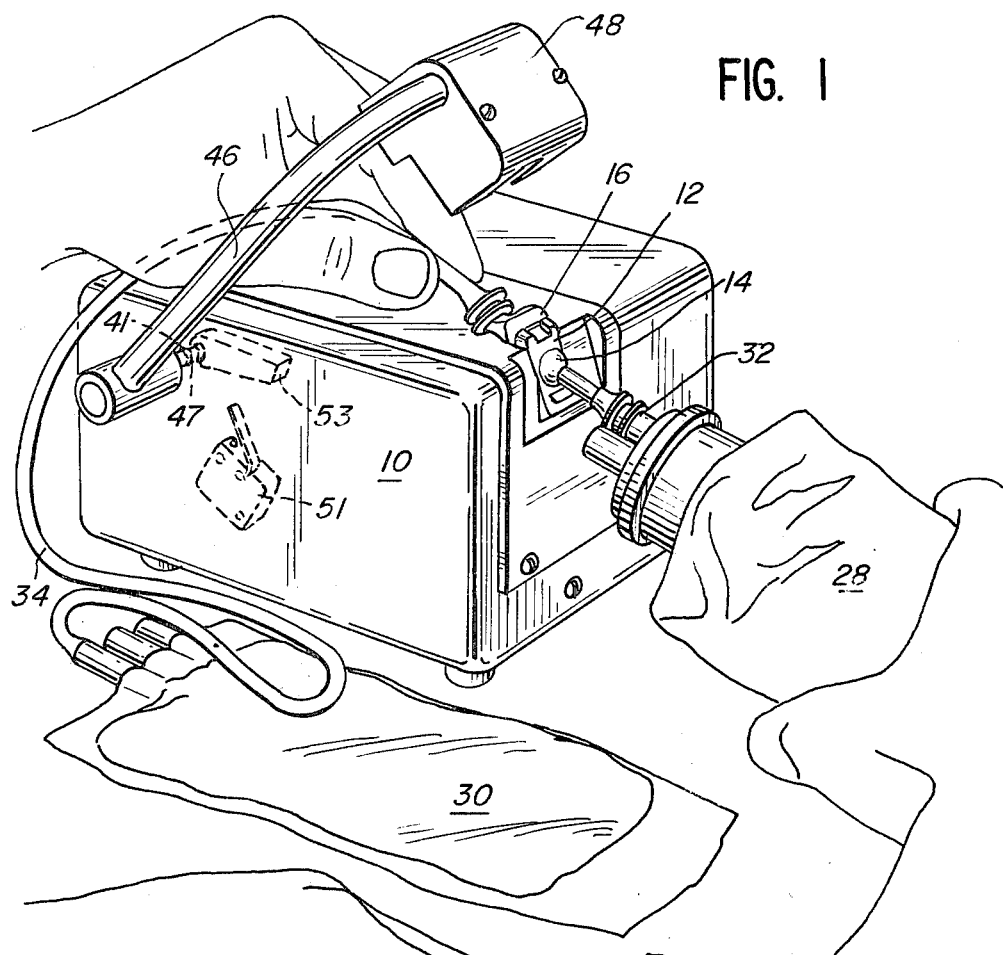
FIG. 1 is a perspective view of one embodiment of the apparatus for applying a radiant beam, with a pair of sterile connectors having abutting, opaque diaphragms being positioned for treatment by the apparatus.

Pivotable switch arm 46 is provided with head 48, being manually operable and preferably equipped with conventional spring means 41 to cause it to retract to position shown in FIG. 1, being pivotably depressable by hand to bring second seat 49 of head 48 into engagement with the sterile connector positioned on first seat 42. Second seat 49 also preferably has a contour to match the shape of the sterile connector it rests against.

Head 48 of switch arm 46 defines tunnel 50 passing through second seat 49, at the bottom of which resides photocell 52 described above.

Photocell 52 is electrically connected by lead 54 to circuitry as described below for shutting off lamp 20 upon the sensing of light from lamp 20. As shown, photocell 52 is positioned in the shadow defined by diaphragms 16, 18 relative to lamp 20, so that a hole must be formed in the diaphragms before light from lamp 20 falls on photocell 52. Photocell 52 is positioned at the bottom of tunnel 50 so that it is shielded from stray light, for example light which is conveyed through a transparent housing, when used, of the sterile connectors 14, 16.

Figure 2:
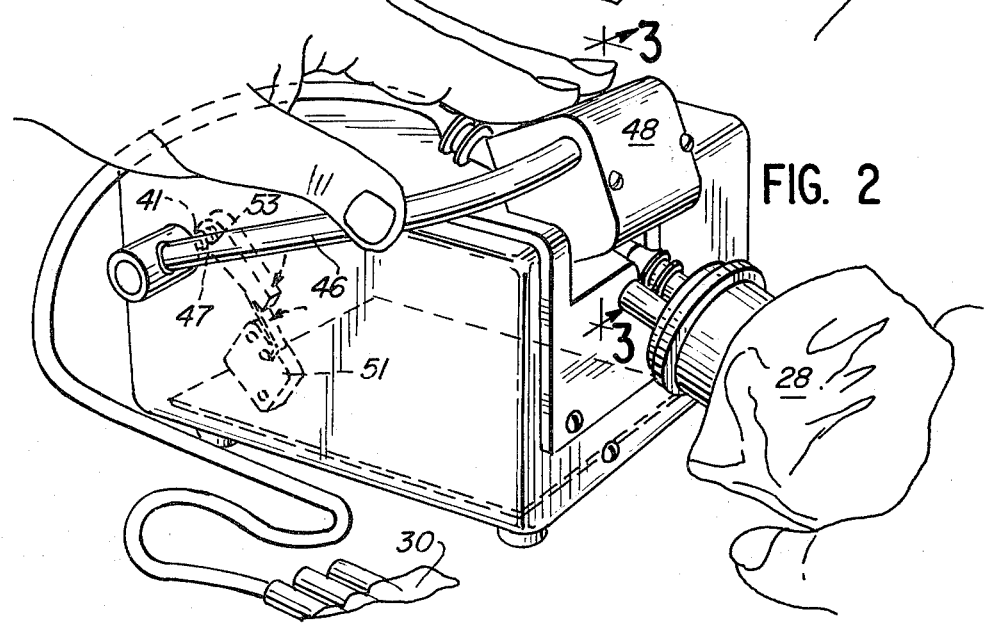
FIG. 2 is a perspective view similar to FIG. 1, showing the pivotable switch arm of the apparatus being brought into engaging relation with the sterile connectors containing the diaphragm means in the apparatus and the initiation of the radiant beam source.
Figure 4:
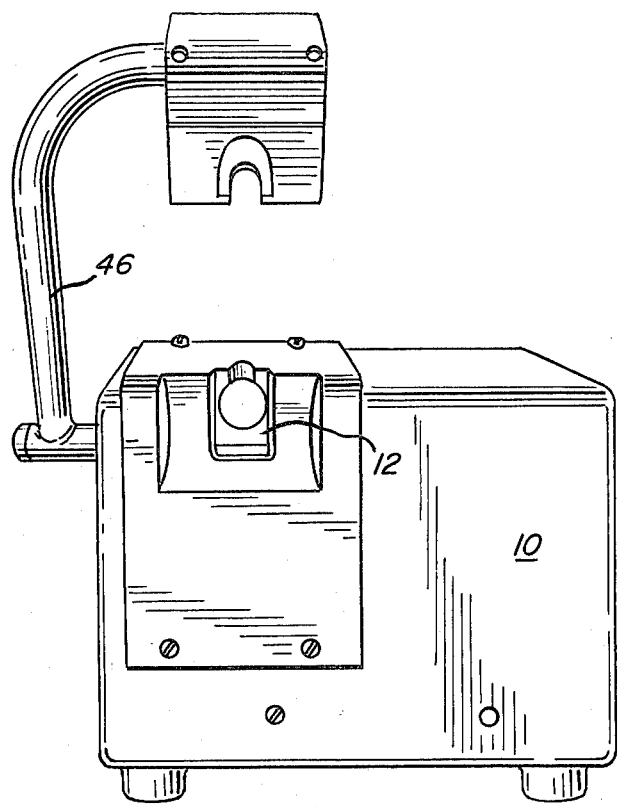
FIG. 4 is a front elevational view of the apparatus of FIG. 1 with the sterile connectors being omitted.

The actuation of switch arm 46 into its active position as shown in FIG. 2 rotates shaft 47 and spring-biased inner arm 53 on shaft 47, to actuate switch 51 to turn the system on in the position shown in FIG. 2, and to spring arm 46 out of the closed position when released. This causes switch to illuminate lamp 20, as one manually holds switch arm 46 in its active position, or alternatively, as can be retained there by a latch or the like as desired. Typically in about 10 seconds the hole opening operation is completed, so that a beam passes through diaphragms 16, 18 to impinge upon photocell 52. The consequent electrical impulse passes through lead 54 into the circuitry to be specifically discussed below to ultimately deactivate lamp 20 in a manner which may be modified by the timer means of the circuitry.

After the lamp 20 has been shut off, one may withdraw the joined sterile connectors 14, 16 from their position between switch arm 46 and first seat 42 with the sterilized connection having been formed between the two containers 28, 30. The device of this invention thus provides the opportunity for rapid opening of sterile connections in systems such as containers 28, 30 using unskilled personnel, since the timing of the radiation exposure can be completely controlled by the apparatus of this invention.

Referring to FIG. 5, a block diagram of the circuitry of the apparatus of the previous figures is illustrated.

When switch 51 is closed, line 60 activates safety timer 77; line 62 activates an on-off memory circuit 64; and line 130 activates the no-hole safety timer 86. Although no limitation is intended, in the illustrative embodiment safety time 77 has a timing cycle of 3.3 seconds and no-hole shut off safety timer has a timing cycle of 17.5 seconds.

The output of memory circuit 64 is amplified by amplifier 66 and fed via line 68 to an optically activated SCR switch 70. This optically activated SCR switch 70, when energized, allows current to flow via AC line 72 through the filament of lamp 20. A capacitive reactance circuit 74 is in series with the AC line to limit the current to the filament, and to allow long lamp life by slow turn on of the filament.

The output of no-hole shut off safety timer 86 is coupled via line 88 to the off input of on-off memory circuit 64.

During the 3.3 second timing cycle of safety timer 77, a signal will be fed via line 120 to enable direct shut-off gate 80. A signal to direct shut-off gate 80 from line 106 will operate to provide a signal via line 84 to the off input of on-off memory circuit 64. Once the off input of on-off memory 64 is pulsed, the lamp 20 will be effectively shut off.

Photocell 52 is positioned on the opposite side of diaphragm 18 from lamp 20. Once photocell 52 receives light, direct shut-off gate 80 will receive a signal via line 106. Prior to the completion of the 3.3 second time cycle of safety timer 77, direct shut-off gate 80 is not inhibited and thus the signal on line 106 will pass through gate 80 to line 84 and to the off input of on-off memory memory 64, thereby effectively shutting off lamp 20. However, once the timing cycle of safety timer 77 is completed, the signal on line 120 will operate to inhibit direct shut off gate 80 and thereafter when light is sensed the signal on line 54 cannot go through gate 80 and can only go through hole enlargement timer 90. Thus after the timing cycle of safety timer 77 is completed, the signal on line 54, if photocell 52 receives light, will activate hole enlargement timer 90. In the illustrative embodiment, hole enlargement timer has a timing cycle of 0.5 second. Until the 0.5 second timing cycle of hole enlargement timer 90 is completed, lamp 20 will continue to be energized to form the proper size hole. However, once the timing cycle of hole enlargement timer 90 is completed, a signal via line 92 will pulse the off input of on-off memory 64 to effectively shut of lamp 20.

Figure 6:
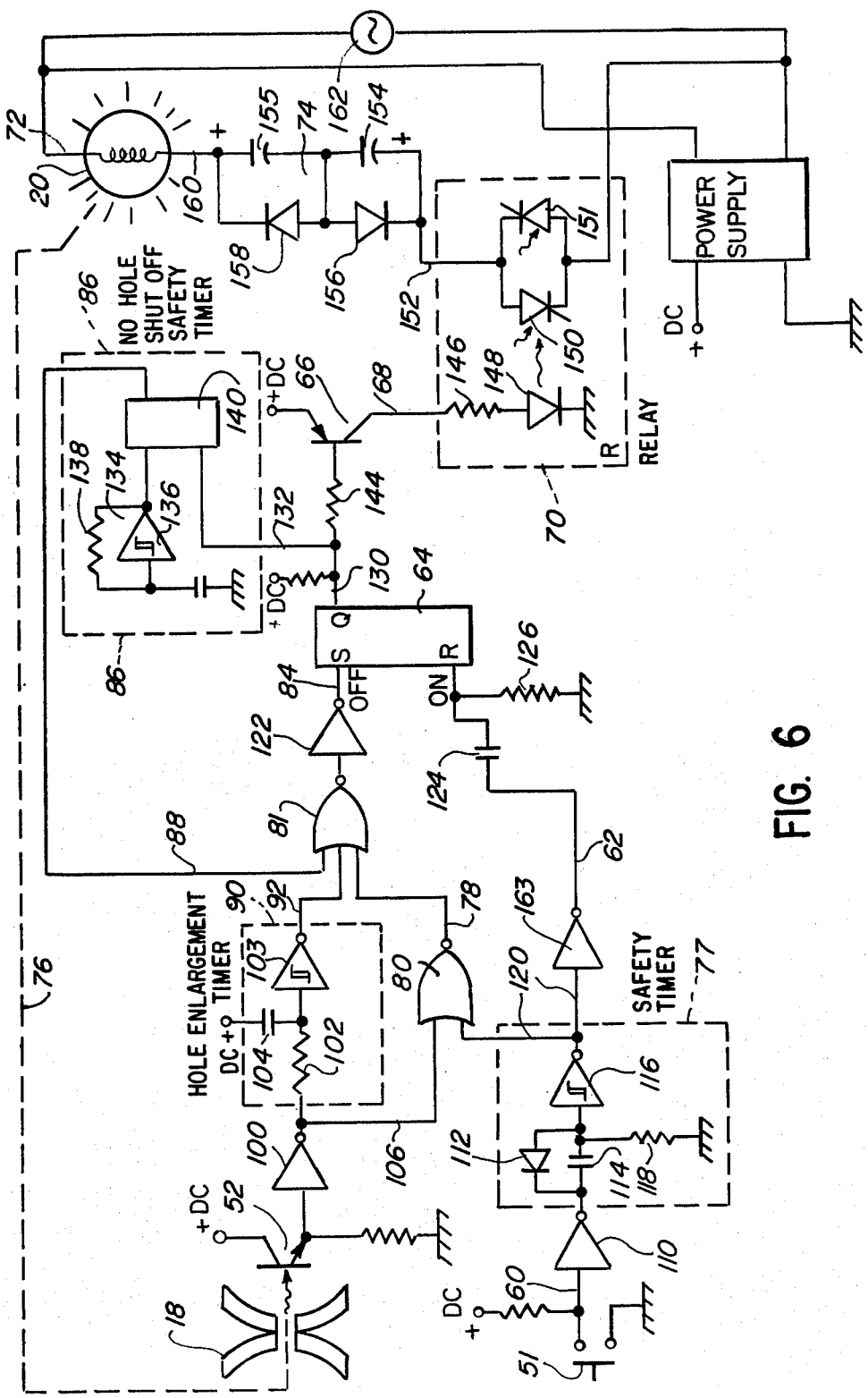
FIG. 6 is a circuit diagram of the circuitry of the apparatus of FIGS. 1-4.

A more detailed schematic diagram of the circuit, using the same reference numerals to refer to the corresponding items, is illustrated in FIG. 6.

Referring to FIG. 6, the diaphragm 18 is in line 76 normally blocking the light from lamp 20 to photocell 52 which is in the form of a phototransistor. The emitter of phototransistor 52 is connected through an inverter 100 to hole enlargement timer 90, which comprises a resistor 102 in series with a Schmidt trigger 103, and having capacitor 104 in shunt with the line coupling resistor 102 to Schmidt trigger 103.

The output 92 of Schmidt trigger 103 is coupled to an input of NOR gate 81. The output of inverter 100 is also coupled via line 106 to an input of NOR gate 80, the output 78 of which is connected to another input of NOR gate 81.

Switch 51 is coupled to energize line 60 which is coupled through inverter 110 to safety timer 77. Safety timer 77 comprises a parallel connected diode 112 and capacitor 114 which is coupled to Schmidt trigger 116, with a shunt resistor 118 connected to the line between capacitor 114 and Schmidt trigger 116. The output of Schmidt trigger 116 is fed via line 120 to the other input of NOR gate 80.

The output of NOR gate 81 is connected through inverter 122 to the off input of an RS flip-flop 64. Line 120 is connected to inverter 163. Line 62 is connected through a series capacitor 124 and shunt resistor 126 to the on input of RS flip-flop 64.

The output of flip-flop 64 is connected via line 130 and line 132 to no-hole shut off safety timer 86.

Timer 86 comprises an oscillator 134 including a Schmidt trigger 136 and resistor 138 coupled to a two-decade up counter 140. The output of up counter 140 is fed via line 88 to another input of NOR gate 81.

Line 130 from the output of flip-flop 64 is also connected via resistor 144 to transistor amplifier 66, the collector of which is coupled to optically activated SCR switch 70. SCR switch 70 comprises a resistor 146 in series with LED 148 of an optical coupler which includes the LED 148 having its light impinging upon an SCR (not shown) which is in a bridge circuit allowing it to fire simultaneously two back-to-back SCR's 150, 151. The optical coupler provides isolation between the logic circuitry and the main line voltage to lamp 20. Thus the LED 148 and its connected circuitry is low voltage DC while the back-to-back SCR's 150, 151 switch the main AC line voltage through lamp 20.

SCR's 150, 151 are coupled via line 152 to capacitive reactance circuit 74. Capacitive reactance circuit 74 comprises two back-to-back polarized high voltage electrolytic capacitors 154, 155, each of which is shunted by a diode connected in the following manner. Diode 156 which shunts capacitor 154 has its anode connected to the negative side of the capacitor and its cathode connected to the positive side of the capacitor 154. Diode 158, which is coupled in shunt with capacitor 155, has its anode connected to the negative side of capacitor 155 and its cathode connected to the positive side of capacitor 155. The positive side of capacitor 155 is also connected via line 160 to one side of the filament of lamp 20 with the other side of the filament being connected to an appropriate alternating current source 162.

In the operation of this system, when start switch 51 is open, lamp 20 is not energized. When start switch 51 is closed, safety timer 77 and no-hole shut off timer 86 begin their timing function. At the same time, lamp 20 is energized because as timer 77 activates, it also causes flip-flop 64 to turn on thereby effectively energizing LED 148 to allow the alternating current to flow through the lamp filament. In the illustrative embodiment, safety timer 77 has a timing cycle of 3.3 seconds. If light is sensed by phototransistor 52 (for example, there is a hole in diaphragm 18) prior to the expiration of the 3.3 second time interval, or if light is sensed by phototransistor 52 because there is nothing shielding the light, then a signal by inverter 100 and gate 80 will be present at an input of gate 81 to pulse the off input of flip-flop 64, thereby shutting off lamp 20.

Once the time interval of safety timer 77 has elapsed, if light is sensed thereafter by phototransistor 52, hole enlargement timer 90 will become activated. As stated previously, hole enlargement timer 90 is operative to set the hole size by maintaining the light burning for a predetermined amount of time once the hole is sensed. After the set interval of hole enlargement timer 90 is completed (for example after 0.5 second) a signal at input NOR gate 81 will operate to pulse the off input of flip-flop 64, thereby effectively shutting off the lamp 20.

As stated previously, when start switch 51 is activated, flip-flop 64 actuates the two-decade up counter 140 of no-hole shut off safety timer 86. After a predetermined time interval (for example 17.5 seconds) if light has not been sensed by phototransistor 52, a signal via line 88 to an input of NOR gate 81 will pulse the off input of flip-flop 64 to effectively shut off lamp 20.

The AC circuit, which includes the back-to-back SCR's 150, 151 and the capacitive reactance circuit 74, provides a transformerless drive for the low voltage lamp 20. Thus lamp 20 may be coupled to a 120 or a 220 volt AC source without utilizing a transformer notwithstanding the fact that the low voltage lamp 20 may utilize only 17 volts.

A flow chart illustrating the operation of the system is presented in FIG. 7.

Referring to FIG. 8, a modified apparatus in accordance with this invention is shown. A pair of sterile connectors 200 are shown having abutting opaque, thermoplastic diaphragms 202 through which an aperture is desired to be melted. The outer portions of the sterile connectors are at least partly transparent to permit the application of radiation to the opaque diaphragms.

In this particular embodiment, focused lamp 204 is provided to irradiate and melt a hole through diaphragms 202. Optionally an additional one or more focused lamps 206 may be provided for added irradiation of the other side of the membrane, if such is desired.

Electric circuit means 208 is schematically shown, with electrical lines 209 connecting lamps 204, 206, with the circuit. A photocell 210, specifically a phototransducer, is positioned in a housing 212 having an aperture 214 to received reflected light.

A light pipe 216 which may be made of glass or plastic, preferably shielded with an opaque shielding, constitutes a part of the photocell means having a tip 218 positioned where a properly positioned diaphragm 202 initially shades the photocell means from the beam emitted by lamp 204. When the hole is formed, as in the previous embodiment, the beam passes through diaphragm 202 and is taken up by the end of light pipe 216 to be transferred to the photocell. Circuitry 208 may be similar to that previously described to deactivate lamps 204, 206 when photocell 210 senses the light beam.

The lamp 206, if present, does not influence the operation of the system since its radiation cannot be transferred into light pipe 216.

Accordingly, by this embodiment while the overall photocell means is indeed positioned in the shade of a properly positioned diaphragm relative to at least one of the lamps, the actual photocell 210 may be positioned away from the lamp system, where it is not subject to heating from the irradiation and thus can operate without varying its properties due to such heating. Also by this system the light can be attenuated as desired through light pipe 216, so that photocells which do not function well in the presence of a direct beam from lamp 204 can be utilized in the more attenuated light coming through the light pipe 216.

The above has been offered for illustrative purposes only, and is not intended to limit the scope of the invention of this application, which is as defined in the claims below.

That which is claimed is:

1. In apparatus for applying a radiant beam against an opaque diaphragm, to melt an aperture in said diaphragm, which comprises bracket means for positioning said diaphragm at a predetermined position, a source of said radiant beam, and electric circuit means for activating said source, the improvement comprising, in combination:

photocell means positioned whereby a properly positioned diaphragm initially shades said photocell means from the beam and said beam strikes said photocell when said aperture is formed, and means to shut off said radiant beam responsive to the beam striking said photocell.

2. The apparatus of claim 1 in which said electric circuit means includes first timer means for shutting off said beam if it strikes said photocell within a predetermined first time period measured from initiation of said beam.

3. The apparatus of claim 2 in which said electric circuit means includes second timer means for shutting off said beam after a predetermined second time period, measured from initiation of said beam and longer than first time period.

4. The apparatus of claim 3 in which said electric circuit means includes third timer means to delay shutting off said beam for a predetermined third time period following the moment of the beam striking said photocell.

5. The apparatus of claim 4 in which said radiant beam source is a filament-type light bulb with an elliptical, focusing reflector having a reflecting surface that reflects substantial radiation emitted by the filament, said filament being positioned essentially at the focus of said elliptical reflector, said filament having a length of no more than ¼ inch and a diameter of no more than ⅛ inch and having a normal operating temperature of at least 3000° K., for providing an intense, focused, radiant beam of no more than essentially 0.3 inch diameter to the predetermined position of said diaphragm.

6. The apparatus of claim 4 in which said bracket means comprises a first seat for engaging and positioning a unit containing said diaphragm at said predetermined position, and a second seat carried by a pivotable switch arm to permit said second seat to also engage said unit, to secure it in one pivoting position of said switch arm, and to initiate said radiant beam source in the same switch arm pivoting position.

7. The apparatus of claim 6 in which the photocell means is carried in said second seat.

8. The apparatus of claim 7 in which said photocell means is separated from said diaphragm in engaging position by scattered light-shielding tunnel means, said photocell being positioned within said tunnel means.

9. In apparatus for applying a radiant beam against an opaque diaphragm to melt an aperture in said diaphragm which comprises bracket means for positioning said diaphragm at a predetermined position, a source of said radiant beam, and electric circuit means for activating said source, the improvement comprising, in combination:

photocell means positioned whereby a properly positioned diaphragm initially shades said photocell means from the beam, and said beam strikes said photocell when the aperture is formed, and means to shut off said radiant beam responsive to the beam striking said photocell, said radiant beam source being a filament-type light bulb with an elliptical, focusing reflector having a reflecting surface that reflects substantial radiation emitted by the filament, said filament being positioned essentially at the focus of said elliptical reflector, said filament having a length of no more than ¼ inch and a diameter of no more than ⅛ inch and having a normal operating temperature of at least 3000° K., for providing an intense, focused radiant beam of no more than essentially 0.3 inch diameter to the predetermined position of said diaphragm.

10. The apparatus of claim 9 in which said light bulb is a halogen cycle lamp having a quartz envelope.

11. In apparatus for applying a radiant beam against an opaque diaphragm sealing a flow passage to melt an aperture in said diaphragm, which comprises bracket means for positioning said diaphragm at a predetermined position, a source of said radiant beam, and electric circuit means for activating said source, the improvement comprising, in combination:

photocell means positioned whereby a properly positioned diaphragm initially shades said photocell means from the beam, and said beam strikes said photocell when said aperture is formed, and means to shut off said radiant beam responsive to the beam striking said photocell, said bracket means comprising a first seat for engaging and positioning a unit containing said diaphragm at said predetermined position, and a second seat carried by a pivotable switch arm to permit said second seat to also engage said unit to secure it in one pivoting position of said switch arm, and to actuate said radiant beam source in the same switch arm pivoting position.

12. In apparatus for applying a radiant beam against an opaque diaphragm to melt an aperture in said diaphragm, which comprises bracket means for positioning said diaphragm at a predetermined position, a source of said radiant beam, and electric circuit means for activating said source, the improvement comprising, in combination:

said radiant beam source being a filament-type light bulb with an elliptical, focusing reflector having a reflective surface that reflects substantial radiation emitted by the filament, said filament being positioned essentially at the focus of said elliptical reflector, said filament having a length of no more than ¼ inch and a diameter of no more than ⅛ inch and having a normal operating temperature of at least 3000° K., for providing an intense, focused radiant beam to the predetermined position of said diaphragm.

13. The apparatus of claim 12 in which said lamp is a halogen cycle lamp having a quartz envelope.

14. In apparatus for applying a radiant beam against an opaque diaphragm to melt an aperture in said diaphragm, which comprises bracket means for positioning said diaphragm at a predetermined position, a source of said radiant beam and electric circuit means for activating said source, the improvement comprising, in combination:

said bracket means comprising a first seat for engaging and positioning a unit containing said diaphragm at said predetermined position, and a second seat carried by a pivotable switch arm to permit said second seat to also engage said unit to secure it in one pivoting position of said switch arm, and to intitiate said radiant beam source in the same switch arm pivoting position.

15. The apparatus of claim 14 in which the photocell means is carried in said second seat.

16. The apparatus of claim 15 in which said photocell means is separated from said diaphragm in engaging position by scattered light-shielding tunnel means, said photocell being positioned within said tunnel means.

17. In apparatus for applying a radiant beam against an opaque diaphragm to melt an aperture in said diaphragm, which comprises bracket means for positioning said diaphragm at a predetermined position, a source of said radiant beam, and electric current means for activating said source, the improvement comprising, in combination:

photocell means positioned whereby a properly positioned diaphragm initially shades said photocell means from the beam and said beam strikes said photocell when the aperture is formed, and means to shut off said radiant beam responsive to the beam striking said photocell means, said photocell means including a light pipe having a light-receiving tip positioned to be initially shaded by said properly positioned diaphragm, said light pipe extending to a position relatively remote from said radiant beam, and a photocell member positioned to receive light from the remote end of said light pipe.

18. The apparatus of claim 17 in which said photocell member is a phototransistor.

* * * * *